T. H. McGRAW, Jr.
STEAM SEPARATOR.
APPLICATION FILED JAN. 19, 1914.
1,122,784.
Patented Dec. 29, 1914.
2 SHEETS—SHEET 2.
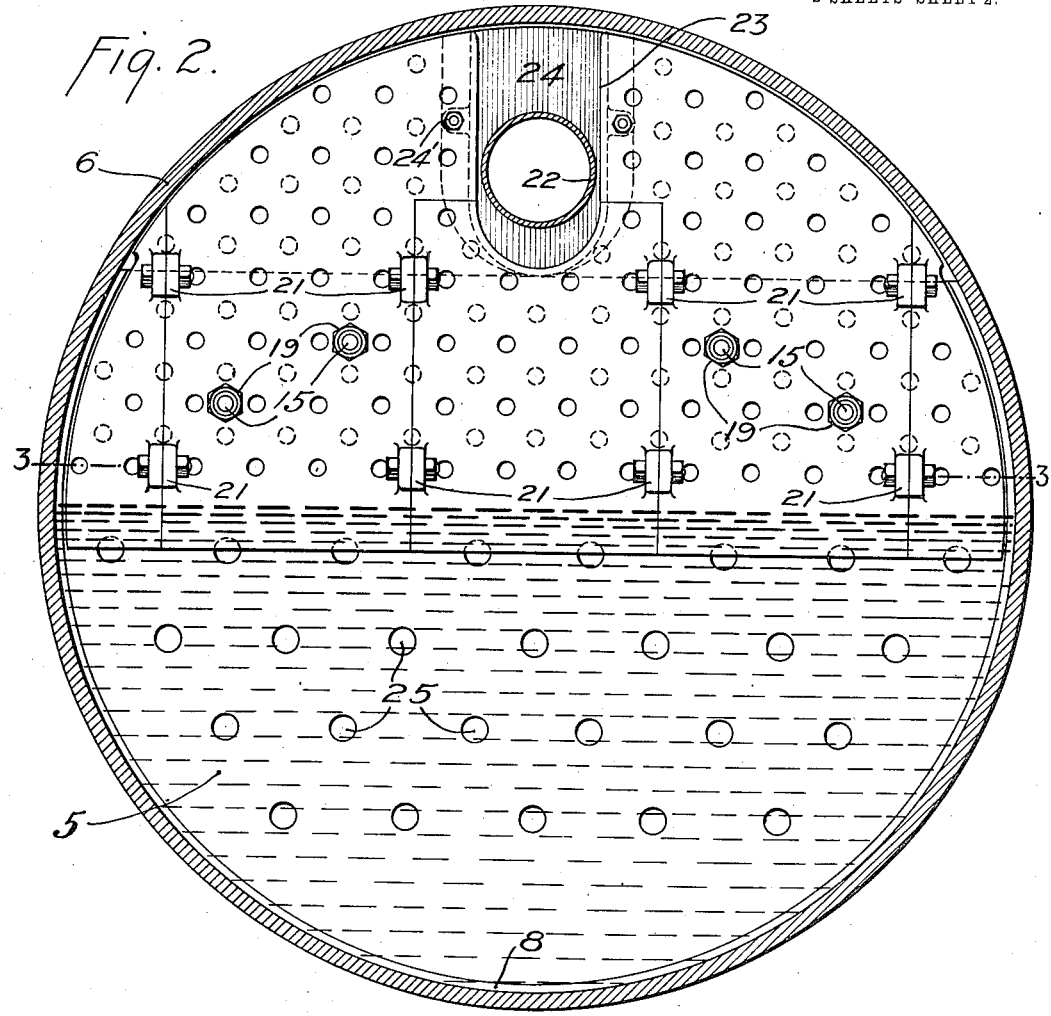
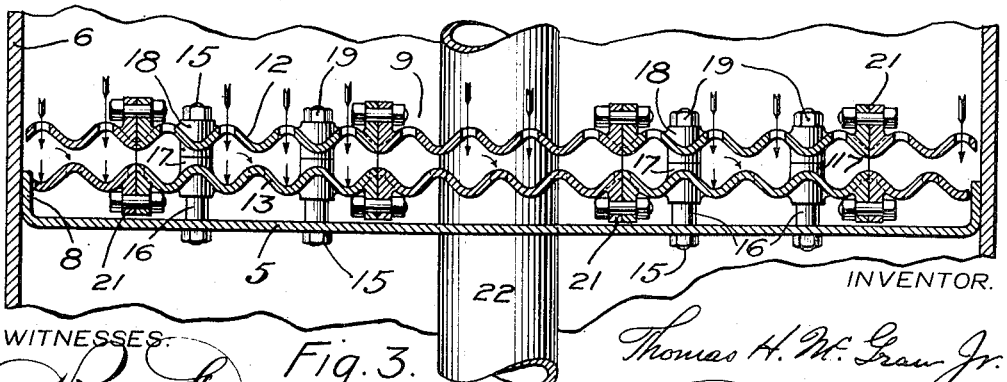
WITNESSES
INVENTOR.
Thomas H. McGraw Jr.
BY
HIS ATTORNEY IN FACT

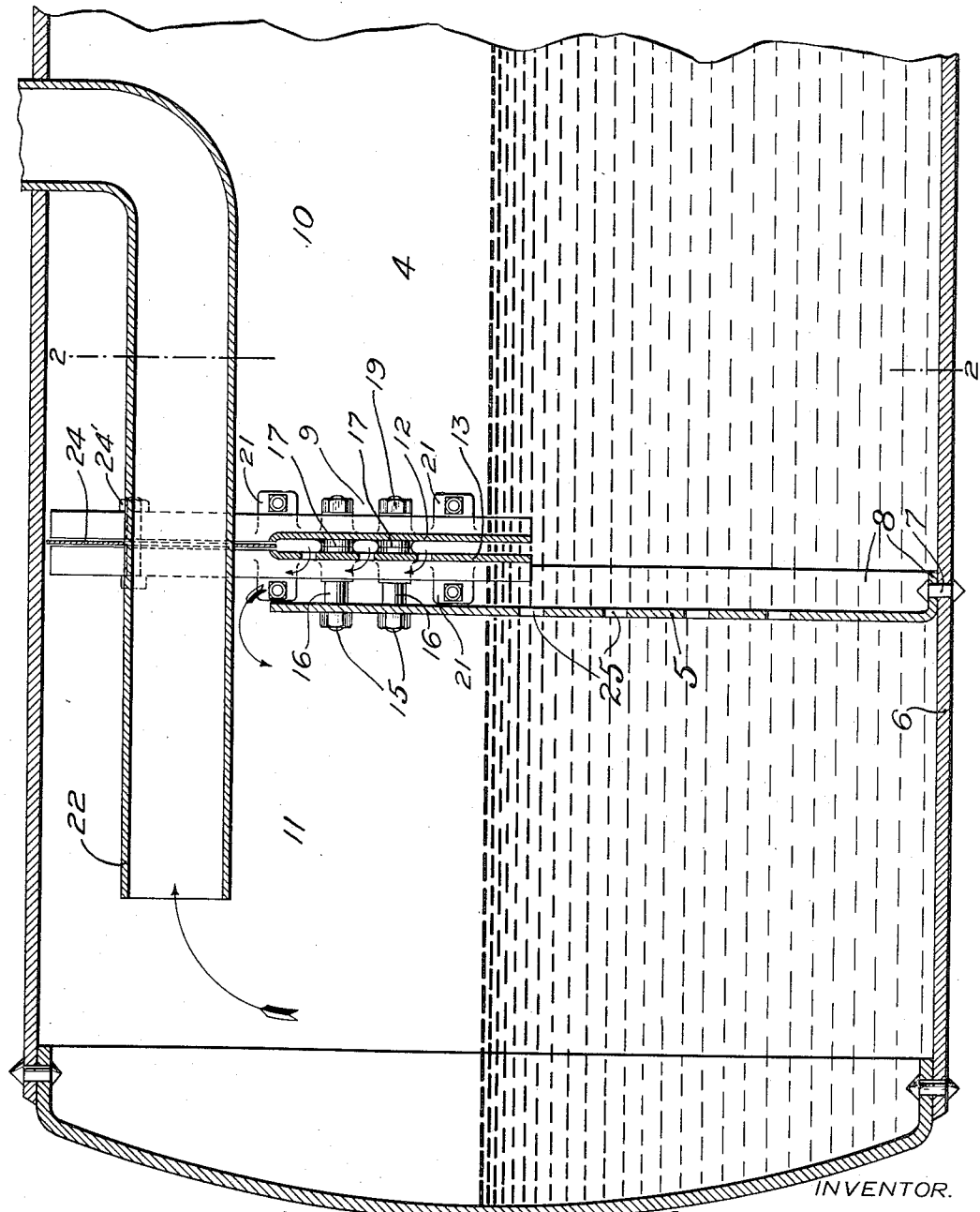

UNITED STATES PATENT OFFICE.

THOMAS H. McGRAW, JR., OF PITTSBURGH, PENNSYLVANIA.

STEAM-SEPARATOR.

1,122,784.    Specification of Letters Patent.    Patented Dec. 29, 1914.

Application filed January 19, 1914. Serial No. 813,077.

*To all whom it may concern:*

Be it known that I, THOMAS H. McGRAW, Jr., a citizen of the United States, and a resident of Pittsburgh, in the county of Allegheny and State of Pennsylvania, have made a new and useful Invention in Steam-Separators, of which the following is a specification.

This invention relates to separators or strainers for separating the moisture from steam or other fluids.

An object of this invention is to produce an improved steam separator which is adapted to be located within and to be supported by the inclosing shell of the drum or container of a steam generator.

A further object is to produce a separator embodying new and improved details of construction and which insures efficiency and effectivenes of operation, and is simpler in the construction of its operating parts than other separators now in use or known to me.

These and other objects are attained by means of the apparatus herein described and illustrated as an embodiment of my invention.

In the drawings accompanying and forming a part of this application: Figure 1 is a fragmental longitudinal sectional view of a steam and water drum of a generator equipped with an embodiment of my invention; Fig. 2 is a transverse sectional view along the line 2—2 of Fig. 1; and Fig. 3 is a horizontal sectional view along the line 3—3 of Fig. 2.

In carrying out my invention I provide a diaphragm which extends transversely across the container or drum of the steam generator, and which divides the lower portion of the container or drum into two parts, in one of which all or a major portion of the steam may be generated, and from the other of which the steam is withdrawn through a steam delivery port or conduit. A separator is mounted near the upper edge of the diaphragm in such a way that it with the diaphragm completely divides the container or drum into two chambers which communicate with each other through apertures formed in the separator and from one of which the steam supply is withdrawn, as before stated.

As illustrated, the separator proper consists of coöperating perforated plates which are located in parallel relation to each other and are placed transversely across the path of flow of the steam leaving the generator, so that the moist steam must pass through the perforations before leaving the generator or container. The plates are so arranged that the perforations of one plate direct the steam passing through them onto an imperforate portion of the next adjacent plate and cause the steam to move through the separator along circuitous paths. With this arrangement the heavier particles, such as vapor or the globules of water mechanically entrained by the steam, are projected against and adhere to an obstructing surface of the separator, from which they drip or gravitate back into the bottom of the container or drum. The plates forming a part of the separator proper are preferably so formed and the apertures provided therein are so positioned with relation to the special contour of the plates that they accentuate the moisture separating action of the separator by causing the steam to be reversed in its flow through the separator and by directing the separate jets of steam into moisture collecting chanels formed in the plates.

Referring now to the drawings, throughout the several views of which like parts are designated by the same reference numerals: A drum or container 4, which may form a part of a steam generator, or which may inclose the generating chamber, is provided at an intermediate point between its ends with a diaphragm or partition 5 which extends transversely across the container and divides the lower portion thereof into two parts. As illustrated, the diaphragm is provided with a flange 8 along its shell engaging edge and is secured to the container shell 6 by any suitable means, such, for example, as rivets 7. The diaphragm also extends upwardly to a point above the longitudinal axis of the container, or to a point well above the water line, when the container is adapted to be employed as a combination water and steam drum. With the exception of the upper edge, the diaphragm conforms in shape to the contour of the inner face of the shell 6, and the flange 8 lies against the shell so as to facilitate the operation of securing the diaphragm to the shell. This arrangement of the diaphragm strengthens the shell, since the diaphragm forms an intermediate internal stay for the shell and by employing the flange 8 it is possible to produce a water-tight joint between the diaphragm and the shell, when it is desirable to do so.

A separator, generally indicated by the numeral 9, is mounted on the diaphragm 5 near its upper edge and, in conjunction with the diaphragm, forms a partition which separates the container 4 into two chambers 10 and 11. As shown, the separator consists of two corrugated plates 12 and 13 which are located in parallel relation to each other and are substantially semi-circular in shape so that their curved edges conform closely to the contour of the upper portion of the shell 6. These plates are so mounted on the diaphragm that their curved edges lie adjacent to the shell 6, although it is unnecessary to provide tight joints between the plates and the shell. Bolts 15 are illustrated as the means employed for mounting the plates 12 and 13 on the diaphragm and each bolt extends through a spacer 16, located between the plate 13 and the diaphragm, a spacer 17, located between the two plates, and a pad or block 18, against which the securing nut 19 of the bolt rests.

The corrugations in the plates 12 and 13 extend vertically and those in one plate are oppositely disposed with relation to those in the other so that the ridges on the forward or steam receiving side of the plate 12 are located opposite to depressions or channels on the steam receiving side of the plate 13. In addition to this, the apertures of each plate are located in the portions of the plate forming the ridges on the steam receiving side. This arrangement provides a vertically extending moisture receiving channel between each vertical row of apertures on each plate. As has been stated, the plates are so located that the ridges on the steam receiving side of one plate are located opposite to channels on the steam receiving side of the other plate, and consequently each vertical row of apertures in one plate is offset laterally with relation to the vertical rows in the other plate. In addition to this the plates are so located that the apertures in one plate are located in staggered relation with those of the other plate. The steam, therefore, passing through the separator plates is caused to pass along circuitous paths, since the steam passing through the apertures of the plate 12 is directed against or into the depressions or moisture receiving channels of the plate 13, and consequently must be reversed in its direction of flow, and also must pass across a portion of the surface of the plate 13 in order to pass through the apertures of that plate. The line of least resistance to flow of a single stream of steam issuing from any one of the apertures in the plate 12 is through any one of the four apertures in the plate 13 around the point of contact of the stream of steam with the plate and consequently the stream will tend to divide into four parts or will flatten out against the surface of the plate 13 while moving toward the apertures formed in it. This phenomenon, together with the reversal in the direction of flow of the steam occasioned by the ridges on the plate 13, insures the separation of moisture from the steam, since the inertia of the water or water vapor held in suspension by the steam will resist the reversal in the direction of its flow to a greater extent than the molecules of dry steam resist this reversal, and consequently the moisture will be projected against and deposited on the plate 13 and will drip or gravitate back into the water contained in the vessel or drum. The same phenomenon takes place on the steam receiving face of the plate 12, since a relatively small amount of steam will pass through the apertures in that plate without having first come into contact with the surface of the plate or without having first been reversed in the direction of its flow by the corrugations formed in the plate.

Each of the plates 12 and 13 are shown built up of smaller sections suitably secured together to form the semi-circular plate. Any means may be employed for securing these sections together, and as illustrated, I have provided lugs 21 along the edges of the sections by means of which they may be bolted together.

In the drawings I have shown a steam delivery pipe 22 projecting into the container and passing rearwardly through the separator plates. In order to provide for this construction, each of the plates 12 and 13 is notched out at 23 and a filler 24 is employed. This filler plate is provided with an aperture through which the pipe 22 extends, and it is secured in place between the plates 12 and 13 by any suitable means, such, for example, as bolts 24', it being understood that the edges of the slots formed in the separate plates are inclined inwardly toward the filler plate, so as to reduce the tendency of steam to flow from the chamber 10 into the chamber 11 through the gap between the plates 12 and 13 and the filler plate.

The diaphragm 5 is shown as provided with apertures 25 which form a means of communication between the chamber 10 and the chamber 11. These apertures are located below the water line within the container drum and therefore permit the water to rise to equal levels on each side of the diaphragm, but do not form a passage for the steam. It will be understood, however, that the diaphragm 5 may be an imperforate plate so that it will seal the lower portion of the chamber 10 from the lower portion of the chamber 11 and produce a vertical steam drum in the end of the container.

When a steam generator, such as illustrated, is provided with a separator embodying my invention, the major portion of the steam will be generated in the chamber 10 and consequently will have to pass through the separator before being delivered to the pipe 22. The steam liberated from the water contained in the chamber 11 on the rear side of the diaphragm will be much drier than the steam liberated in the chamber 10, since the surface of the water will be quiet and will be free from the ebullitions occurring in the generating chamber 10.

In accordance with the requirements of the United States Patent Statutes, I have illustrated and described what I now consider to be the preferred embodiment of my invention, but I desire to have it understood that while I have illustrated and described my invention as embodied in a steam separator, it may be employed as a separator or strainer for other fluids, and that various changes, modifications, and omissions may be made in the apparatus illustrated without departing from the spirit and scope of my invention as set forth by the appended claims.

Having thus described my invention, what I claim is:

1. In combination with a steam and water container of a steam generator, a separator located between the steam generating portion and the steam delivering portion of the container, comprising substantially flat corrugated plates, located in parallel relation to each other, extending from the top of the container to a point below the water line thereof and having fluid passing perforations formed therein, the perforations being so positioned in the plates that fluid passing through one plate is directed into imperforate channels formed by the corrugations in the adjacent plate.

2. A separator, located within and secured to the shell of a fluid container, and comprising perforated, corrugated plates, located in parallel relation to each other and extending across the line of fluid flow through the container, the perforations in each plate being located in the elevations formed on the fluid receiving side of each plate by the corrugations, and the perforations in one plate being offset laterally with relation to the perforations in the adjacent plate.

3. A separator located within the shell of a fluid container, and comprising perforated, corrugated plates spaced apart, located in parallel relation to each other, and extending across the line of fluid flow through the container, the corrugations in each plate extending vertically, the perforations in each plate being formed in the ridges on the fluid receiving side of the plate formed by the corrugations and being located in staggered relation with the perforations in the next adjacent plate.

4. In combination with a fluid and liquid container, a diaphragm extending across the liquid containing portion of the container and secured to the shell of the container, and a separator mounted on said diaphragm and forming therewith a partition extending transversely across the container.

5. In combination with a fluid and liquid container, a diaphragm extending across the liquid containing portion of the container and secured to the shell of the container, and a separator mounted on said diaphragm, and comprising substantially parallel perforated plates extending across the line of flow of fluid through the perforator.

6. The combination with the steam and water container of a steam generator, a transversely extending diaphragm mounted on the shell of the container and extending partially across the container intermediate its ends, and having perforations formed therein below the water line of the container, and a separator mounted on the upper portion of the diaphragm and comprising corrugated and perforated plates spaced apart and extending substantially parallel to each other.

7. In combination with a water and steam container, a diaphragm located within, extending partially across and secured to the shell of the container, and a separator mounted on said diaphragm and forming therewith a partition extending transversely across the container.

8. In combination with a water and steam container, a diaphragm located within and extending partially across the container and secured to the container shell at a point between the ends thereof, and a separator secured to the upper portion of the diaphragm, and comprising corrugated plates, spaced apart, located in substantially parallel relation and having steam delivery apertures formed therein, the corrugations of each plate being located opposite to imperforate portions of the other plate.

9. In combination with the drum of a boiler adapted to be partially filled with steam and partially with water, a vertically extending dual diaphragm partition extending from the top of said drum to a point below the water line thereof, and steam ports or passages extending through said diaphragms, the passages in one diaphragm being located in staggered relation to those of the other, and a diaphragm extending from the bottom of the drum to a point above the water line on which said dual diaphragm is mounted.

10. In combination with the steam and water container of a steam generator, a transversely extending diaphragm mounted on the shell of the container and extending partially across the container intermediate its ends, and a separator mounted on the upper portion of the container and comprising substantially flat plates located in parallel relation to each other, each plate having a plurality of vertically extending rows of fluid delivering apertures formed therein, the apertures in each plate being so formed therein that the fluid streams passing through apertures in one plate are directed into imperforate channels formed between the rows of apertures in the next plate.

11. In combination with the steam and water container of a steam generator, a diaphragm mounted on the shell and extending transversely across the shell at a point intermediate the ends of the shell, and a separator mounted on the diaphragm and forming therewith a partition extending across the shell and comprising corrugated plates spaced apart and having perforations in the ridges formed by the corrugations on the steam-receiving side of the plate, said plates being so located that the corrugations extend vertically and the perforations in one plate are located in staggered relation with the perforations in the next adjacent plate.

In testimony whereof, I have hereunto subscribed my name this 15th day of Jan., 1914.

THOMAS H. McGRAW, Jr.

Witnesses:
A. A. McClung, Jr.,
N. L. Holmes.